(12) United States Patent
Strasik et al.

(10) Patent No.: US 10,001,232 B2
(45) Date of Patent: Jun. 19, 2018

(54) SYSTEMS AND METHODS FOR DUCT PROTECTION

(71) Applicant: THE BOEING COMPANY, Huntington Beach, CA (US)

(72) Inventors: Michael Strasik, Sammamish, WA (US); Jean-Michel Fouard, Marysville, WA (US); Christopher Wheaton, Snohomish, WA (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 14/657,563

(22) Filed: Mar. 13, 2015

(65) Prior Publication Data

US 2016/0265702 A1    Sep. 15, 2016

(51) Int. Cl.
*F16L 23/04* (2006.01)
*F16L 57/00* (2006.01)

(52) U.S. Cl.
CPC .............. *F16L 23/04* (2013.01); *F16L 57/00* (2013.01)

(58) Field of Classification Search
CPC ........ F16L 23/02; F16L 23/036; F16L 23/167
USPC ................................................. 285/114, 260
See application file for complete search history.

(56) References Cited

U.S. PATENT DOCUMENTS

| | | | |
|---|---|---|---|
| 2,766,614 A * | 10/1956 | Cook | F16L 23/167 174/151 |
| 3,254,651 A * | 6/1966 | Collito | A61B 17/11 285/260 |
| 3,347,566 A * | 10/1967 | Nelson | F16L 37/00 128/202.27 |
| 3,704,034 A * | 11/1972 | Shire | F16L 27/113 285/114 |
| 3,850,451 A * | 11/1974 | Matthiessen | F16L 23/167 116/200 |
| 3,948,295 A | 4/1976 | Lemont et al. | |
| 4,093,282 A * | 6/1978 | Kyriakodis | F16L 33/08 285/114 |
| 4,275,769 A | 6/1981 | Cooke | |
| 4,335,905 A | 6/1982 | Bac | |
| 4,848,409 A | 7/1989 | Jahnke, Jr. | |
| 4,942,903 A | 7/1990 | Jacobsen | |

(Continued)

FOREIGN PATENT DOCUMENTS

| | | |
|---|---|---|
| CN | 201531711 U | 7/2010 |
| SU | 1080237 A1 | 3/1984 |
| WO | 2011075541 A1 | 6/2011 |

OTHER PUBLICATIONS

Great Britain Search Report for related application GB1413705.3 dated Jan. 20, 2015, 4 pp.

(Continued)

*Primary Examiner* — David Bochna
(74) *Attorney, Agent, or Firm* — Armstrong Teasdale LLP (57) ABSTRACT

Methods and systems for protecting a duct joint are provided. An assembly for protecting a joint formed between a first duct and an adjacent second duct includes a first coupling element coupled about the first duct and a second coupling element coupled about the second duct. The assembly also includes a plurality of axial straps coupled between the first coupling element and the second coupling element such that each axial strap of the plurality of straps forms a loop that encircles a portion of each of the first coupling element and the second coupling element.

18 Claims, 7 Drawing Sheets

(56) References Cited

U.S. PATENT DOCUMENTS

| | | | |
|---|---|---|---|
| 5,137,230 A | | 8/1992 | Coffinberry |
| 5,507,533 A | * | 4/1996 | Mumma ............... F16L 55/005 285/114 |
| 5,713,388 A | | 2/1998 | Brewer |
| 5,741,029 A | * | 4/1998 | Wilson ................... F16L 25/14 285/114 |
| 5,828,003 A | | 10/1998 | Thomeer et al. |
| 5,873,608 A | * | 2/1999 | Tharp ................... F16L 55/005 285/114 |
| 6,062,610 A | | 5/2000 | Andersson |
| 6,627,561 B1 | | 9/2003 | Wulliman et al. |
| 6,848,720 B2 | | 2/2005 | Carns et al. |
| 7,493,911 B2 | | 2/2009 | Carns et al. |
| 7,658,983 B2 | | 2/2010 | Mormont et al. |
| 8,387,748 B2 | | 3/2013 | Richardson et al. |
| 8,454,056 B2 | | 6/2013 | Fernandes |
| 8,567,064 B1 | * | 10/2013 | Wright ................... F16L 31/00 285/260 |
| 9,395,025 B2 | * | 7/2016 | Ireland ................... F16L 21/08 |
| 9,534,718 B2 | * | 1/2017 | O'Neil ................... F16L 35/00 |
| 2005/0052018 A1 | | 3/2005 | Pichotta |
| 2006/0284018 A1 | | 12/2006 | Carns et al. |
| 2007/0252385 A1 | * | 11/2007 | Piantoni ................ F16L 55/005 285/114 |
| 2009/0102187 A1 | | 4/2009 | Carns et al. |
| 2010/0037974 A1 | | 2/2010 | Fernandes et al. |
| 2010/0084035 A1 | | 4/2010 | Binet et al. |
| 2010/0147446 A1 | | 6/2010 | Ciolczyk et al. |
| 2012/0005866 A1 | * | 1/2012 | Ireland ................... F16L 21/08 |
| 2012/0018014 A1 | | 1/2012 | Fernandes et al. |
| 2013/0263963 A1 | | 10/2013 | Kalman et al. |

OTHER PUBLICATIONS

Great Britain Examination Report for related application GB1413705.3 dated Jul. 9, 2015; 2 pp.
U.S. Appl. No. 13/961,162, filed Aug. 7, 2013.
U.S. Appl. No. 14/448,905, filed Jul. 31, 2014.
Great Britain Examination Report for related application GB1413705.3 dated Oct. 12, 2015; 2 pp.
U.S. Appl. No. 14/448,305, filed Jul. 31, 2014.

* cited by examiner

SYSTEMS AND METHODS FOR DUCT PROTECTION

BACKGROUND

The field of the disclosure relates generally to duct protection, and more specifically, to methods and systems for protection of a joint formed by adjacent duct sections.

At least some known vehicles and facilities include ducts for channeling a flow of hot air, gases, or fluids through the vehicle or the facility. Often such ducts are positioned near structures that may be sensitive to heat and/or moisture. As such, if a rupture or burst in a duct occurs near such a structure, fluids escaping from the fractured duct, and/or debris that break off from the duct, may cause the structure to malfunction and/or undesired impact to the associated vehicle. In some known vehicles, a structural shielding system is used to create a physical barrier to separate and protect sensitive structures from ducts. However, a structural shielding system can be difficult or cumbersome to install, may be physically heavy, and/or expensive to manufacture or maintain.

At least some known duct systems include couplings that connect two adjacent duct sections at a joint. Generally, conventional couplings rely primarily on friction, and may not provide sufficient compressive force to prevent decoupling of the duct sections under certain conditions. In the event of a coupling failure, the adjacent duct sections may instantaneously separate due to the high pressure fluid flow within the ducts. Such sudden separation often leads to a rapid depressurization of the ducts and may have an undesirable effect on the structure surrounding the ducts.

As such, there is a need for a system or device that is able to maintain a compressive force between adjacent duct sections in the event of a coupling malfunction to prevent rapid duct separation, to extend the time of decompression, and to protect any sensitive structures surrounding the duct.

BRIEF DESCRIPTION

In one aspect, an assembly for protecting a joint formed between a first duct and an adjacent second duct is provided. The assembly includes a first coupling element coupled about the first duct and a second coupling element coupled about the second duct. The assembly also includes a plurality of axial straps coupled between the first coupling element and the second coupling element such that at least one axial strap of the plurality of straps forms a loop that encircles a portion of the first coupling element and the second coupling element.

In another aspect, a method of maintaining the integrity of a duct joint is provided. The method includes coupling a first coupling element about a first duct and coupling a second coupling element is coupled about a second duct. The first and second ducts are positioned proximate one another to form a joint therebetween. The method also includes coupling a plurality of axial straps between the first and second coupling elements such that at least one axial strap of the plurality of straps forms a loop that encircles a portion of the first and second coupling elements. A compressive force is applied to the first and second ducts to maintain the integrity of the joint.

In yet another aspect, an aircraft is provided. The aircraft includes a first duct and a second duct coupled to the first duct to form a joint therebetween. The aircraft also includes a joint protection assembly that includes a first coupling element coupled about the first duct and a second coupling element coupled about the second duct. The joint protection assembly also includes a plurality of axial straps coupled between the first coupling element and the second coupling element such that at least one axial strap of the plurality of straps forms a loop that encircles a portion of the first coupling element and the second coupling element, wherein the plurality of axial straps apply a compressive force to the first and second ducts at the joint to maintain the integrity of the joint.

The features, functions, and advantages that have been discussed can be achieved independently in various examples or may be combined in yet other examples, further details of which can be seen with reference to the following description and drawings.

BRIEF DESCRIPTION OF THE DRAWINGS

FIG. 1 is side view of a partially assembled exemplary duct protection system illustrating a plurality of straps in a first position.

DETAILED DESCRIPTION

The systems and methods described herein enable duct protection of a vehicle. As used herein, the term "vehicle" refers to any mobile machine capable of transporting passengers, cargo, and/or equipment. For example, a vehicle may be included, but is not limited to only being an automobile (e.g., car, bus, and truck), a watercraft, a sailcraft, an aircraft, and/or a spacecraft.

Figure 1:
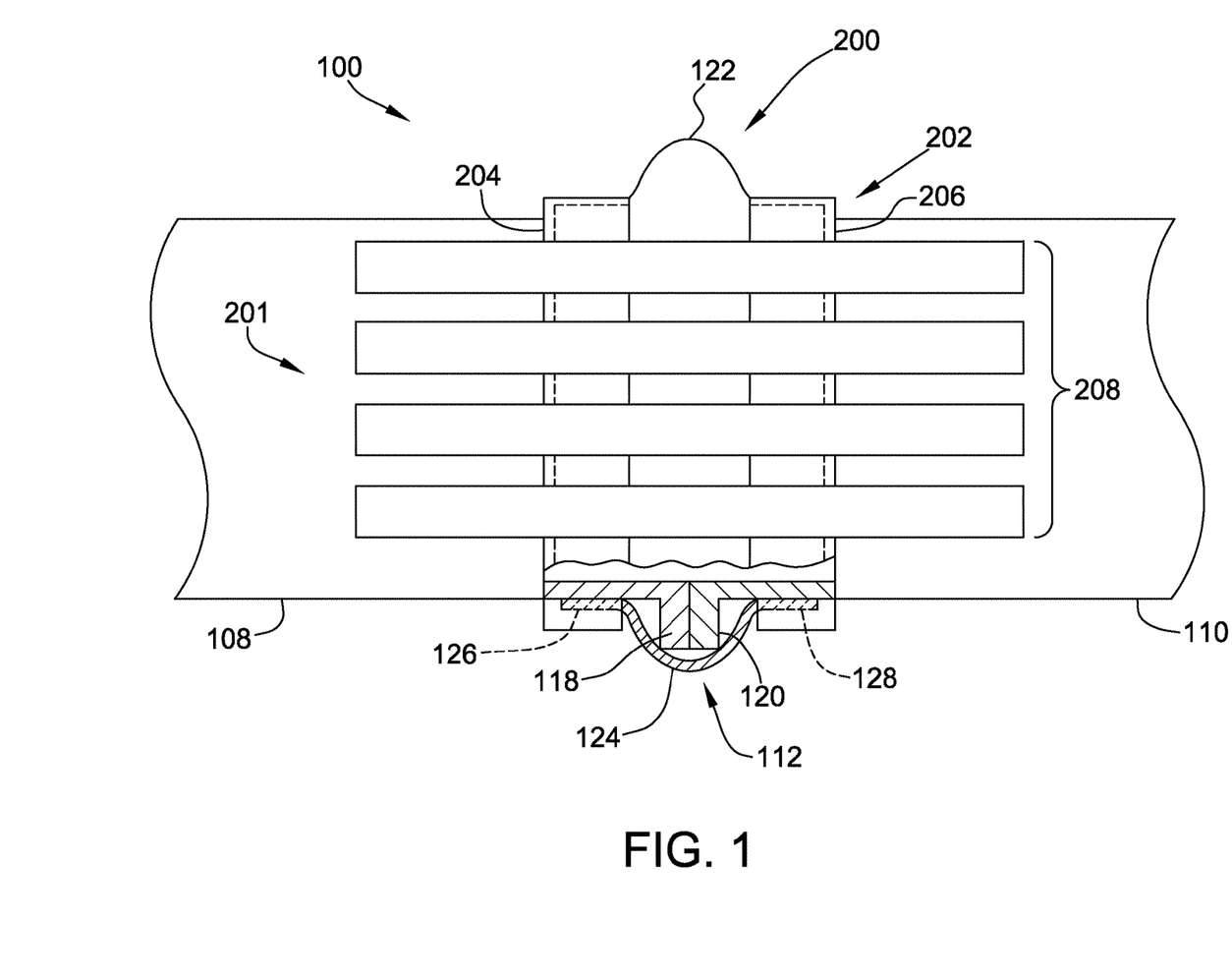
FIG. 1 is a top view of an exemplary duct system that may be used in a vehicle.

FIG. 1 is a side view of a portion of a duct system 100 for use within a vehicle. Specifically, FIG. 1 is a side view of a partially assembled duct protection system 200, which may be used with duct system 100. Duct system 100 includes at least a first duct section 108, an adjacent second duct section 110, and a joint 112 formed at a junction of sections 108 and 110. In the exemplary implementation, duct system 100 is configured to channel a high pressure and/or high temperature fluid therethrough. First duct 108 includes a first flange 118 and second duct 110 includes a second flange 120. Flange 118 is abutted against flange 120 to form joint 112. Flanges 118 and 120 are coupled together using a coupling 122 that spans across joint 112 and flanges 118 and 120. In the exemplary implementation, coupling 122 includes a body portion 124 that is substantially U-shaped in cross-section. Coupling 122 also includes a first leg 126 that extends from body 124 along first duct 108 and a second leg 128 that extends from body 124 along second duct 110. In operation, coupling 122 is tightened to generate a substantially uniform compressive force at joint 112 to couple ducts 108 and 110 together. More specifically, a circumference of coupling 122 is reduced such that flanges 118 and 120 are forced together by body portion 124 of coupling 122. Alternatively, duct system 100 may include any type of coupling that couples flanges 118 and 120 of ducts 108 and 110 together and facilitates operation of duct system 100 and duct protection system 200 as described herein.

In the exemplary implementation, duct protection system 200 includes a joint protection assembly 201 that includes a plurality of fastening devices 202 (referred to herein as "straps") coupled to ducts 108 and 110. Generally, straps 202 of joint protection assembly 201 are configured to apply a compressive force to flanges 118 and 120 that counteracts the duct's plug force to prevent rapid duct separation, as described in further detail below. More specifically, a first circumferential strap 204 is coupled about a circumference of first duct 108 proximate first flange 118 and a second circumferential strap 206 is coupled about a circumference of second duct 110 proximate second flange 120. In one example, circumferential straps 204 and 206 at least partially overlap a portion of coupling 122, such as a respective one of coupling legs 126 and 128, such that straps 204 and 206 at least partially secure coupling 122 to joint 112. Alternatively, circumferential straps 204 and 206 are spaced a distance from legs 126 and 128 and does not overlap a portion of coupling 122.

In the exemplary implementation, joint protection assembly 201 also includes a plurality of axially-oriented straps 208 that extend along ducts 108 and 110 and spans joint 112. More specifically, at least one axial strap 208 is coupled to circumferential straps 204 and 206 such that at least one axial strap 208 extends over coupling 122 between circumferential straps 204 and 206. Axial straps 208 are equally spaced about the circumference of joint 112 such that, in operation, axial straps 208 apply a substantially uniform compressive force at joint 112 to coupling 122 and flanges 118 and 120. In the exemplary implementation, duct protection system 200 includes a number of axial straps 208 within a range of between 5 straps and 13 straps. Alternatively, duct protection system 200 includes any number of axial straps 208 to facilitate operation of duct protection system 200 as described herein. Generally, the number of axial straps 208 required by duct protection system 200 is based on the compressive force required to prevent ducts 108 and 110 from rapidly separating in the event that coupling 122 separates from flanges 118 and 120. Such a compressive force allows minimal separation to enable slow depressurization of ducts 108 and 110 and is calculable given both the circumference of ducts 108 and 110 and also the pressure of the fluid within ducts 108 and 110.

Figure 2:
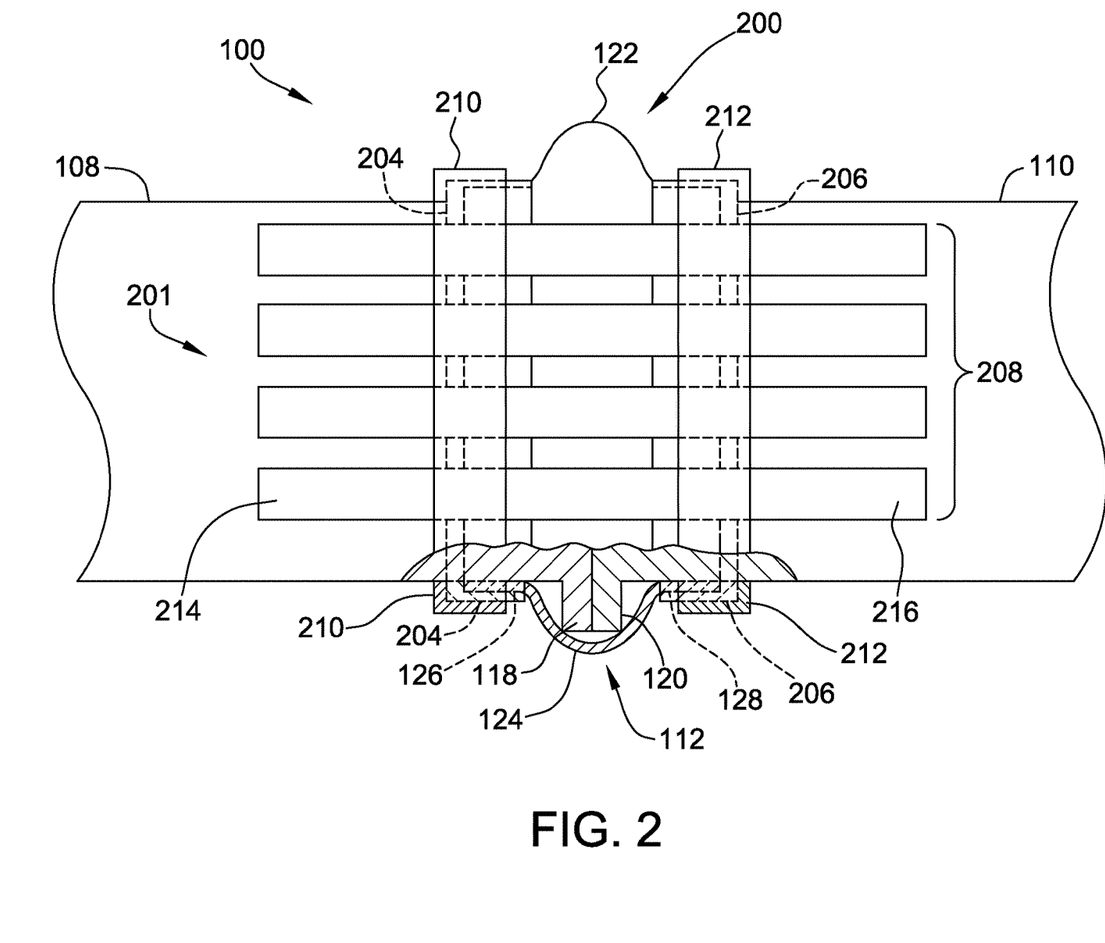
FIG. 2 is a side view of the partially assembled duct protection system illustrating a pair of coupling clamps.
Figure 3:
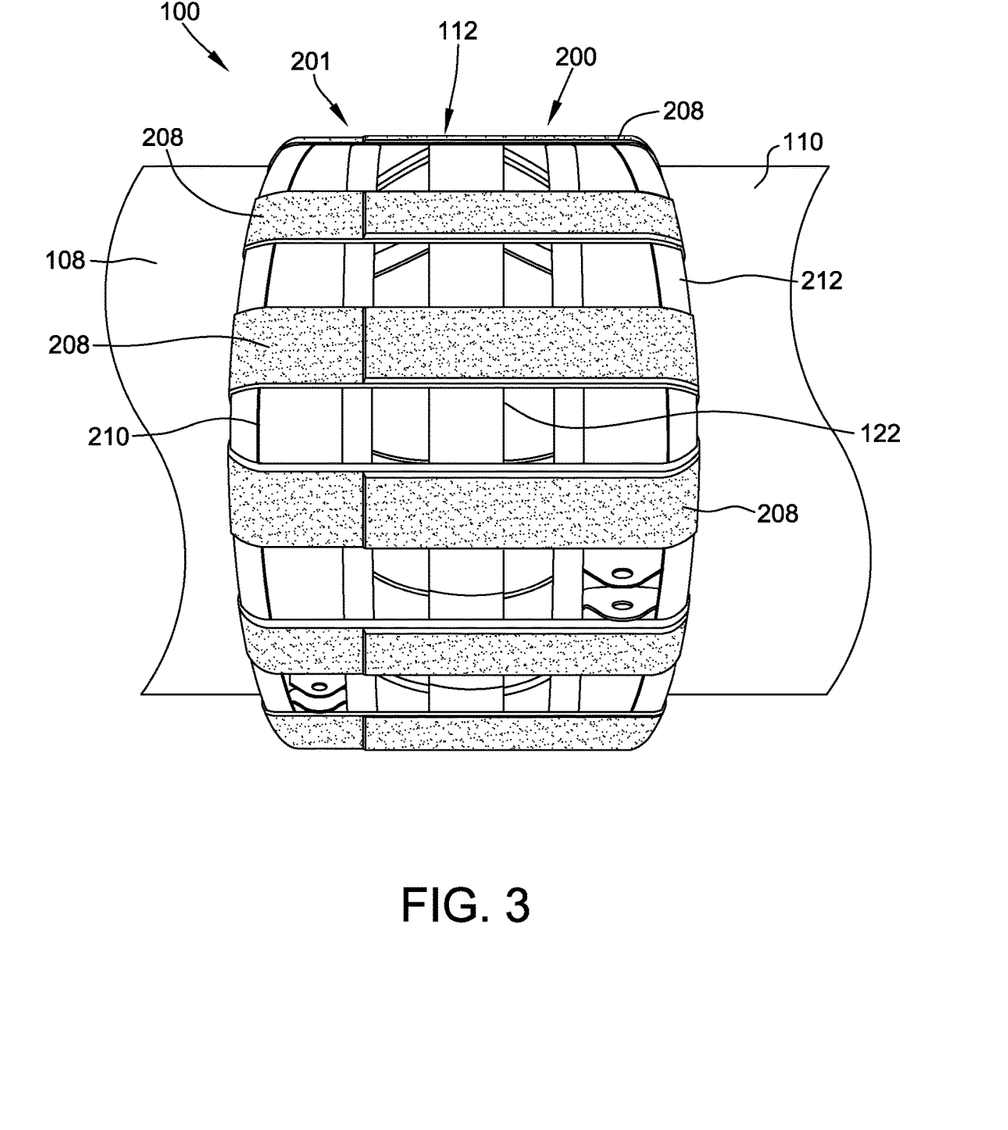
FIG. 3 is a side view of the partially assembled duct protection system illustrating the plurality of straps wrapped about the pair of coupling clamps in a second position.
Figure 4:
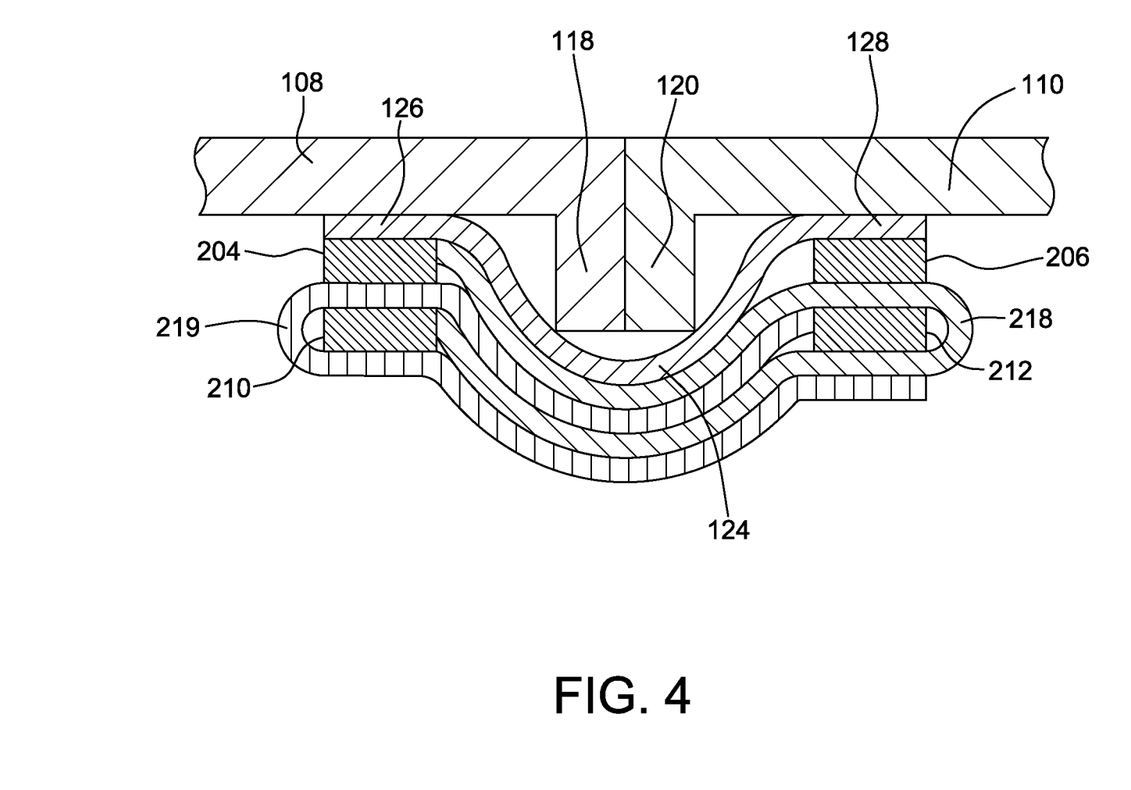
FIG. 4 is an enlarged view of a portion of the duct protection system.

FIG. 2 is a side view of the partially assembled duct protection system 200. Specifically, FIG. 2 illustrates a subsequent step in a method of assembling duct protection system 200 after that as shown and described in FIG. 2. Additionally, the cross-sectional portion of FIG. 2 illustrates the cross-section of joint 112 at a point along the circumference of joint 112 at which there is no axial strap 208. FIG. 3 is a side view of the partially assembled duct protection system 200. Similarly, FIG. 3 illustrates a subsequent step in a method of assembling duct protection system 200 after that as shown and described in FIG. 3. FIG. 4 is an enlarged view of a portion of the duct protection system 200. More specifically, FIG. 4 illustrates the cross-section of joint 112 at a point along the circumference of joint 112 at which an axial strap 208 crosses joint 112.

In the exemplary implementation, joint protection assembly 201 includes a first coupling clamp 210 and a second coupling clamp 212. First coupling clamp 210 is coupled about first duct 108 proximate first flange 118 such that first coupling clamp 210 at least partially overlaps at least one axial strap 208, first circumferential strap 204, and first leg 126 of coupling 122. Similarly, second coupling clamp 212 is coupled about second duct 110 proximate second flange 120 such that second coupling clamp 212 at least partially overlaps at least one axial strap 208, second circumferential strap 206, and second leg 128 of coupling 122. Alternatively, coupling clamps 210 and 212 are spaced from flanges 118 and 120 and do not overlap a portion of straps 204 and 206 or coupling 122. Generally, coupling clamps 210 and 212 are configured to secure straps 202 to joint 112.

When coupling clamps 210 and 212 are coupled to ducts 108 and 110, a first end 214 of at least one axial strap 208 extends beyond first coupling clamp 210 in a direction away from joint 112. Similarly, a second end 216 of at least one axial strap 208 extends beyond second coupling clamp 212 in a direction away from joint 112. Once coupling clamps 210 and 212 are in position, at least one axial strap 208 is fastened about coupling clamps 210 and 212. More specifically, first end 214 is folded over the top of first coupling clamp 210 toward joint 112 and second end is folded over the top of second coupling clamp 212 toward joint 112 such that ends 214 and 216 are coupled to each other and at least partially overlap. In such a configuration, each axial strap spans joint 112 while forming a loop that encircles portions of both coupling clamps 210 and 212 and extends over the outside surface of coupling 122. Alternatively, straps 208 may extend through openings defined in at least one of coupling clamps 210 and 212, coupling 122, and flanges 118 and 120, or may be positioned between coupling 122 and flanges 118 and 120. Generally, straps 208 are configured to apply a compressive force on, ultimately, flanges 118 and 120 to facilitate operation of joint protection assembly 201 and duct protection system 200 as described herein.

In the exemplary implementation, at least a portion of strap 202 is formed from a metallic material, such as, but not limited to stainless steel. The metallic material provides for increased holding strength when straps 202 are loaded in tension. Further, strap 202 is a single sided fastener having one of a hook material or loop material coupled to a backing. Connected straps 202 have opposing hook or loop material such that straps 202 are releasable to allow for inspection and/or replacement of coupling 122, clamps 210 and 212, and/or ducts 108 and 110. Alternatively, axial straps 208 may be formed from a different material than circumferential straps 204 and 206. Generally, straps 202 may be formed from any material that enable joint protection assembly 201 to operate as described herein. Further, straps 202 are not limited to being hook and loop fasteners as described herein, and may be any type of fastener that enables joint protection assembly 201 to operate as described herein.

Additionally, in the exemplary implementation, each strap 208 is formed from a plurality of strap segments, as shown in FIG. 4. In one configuration, circumferential straps 204 and 206 include an outward facing hook or loop material. A first strap segment 218 is a strap having double-sided hook material and is coupled adjacent first circumferential strap 204 at an end of first strap segment 218 and extends across joint 112, over second circumferential strap 206, and along the second duct portion 110. A second strap segment 219 is a strap having double-sided loop material and is coupled adjacent second circumferential strap 204 at an end of second strap segment 219 and extends across joint 112, over first circumferential strap 204, and along the first duct portion 108 such that the second strap segment 219 overlaps the first strap segment 218 between circumferential straps 204 and 206. First coupling clamp 210 is then coupled about first circumferential strap 204 such that the second strap segment 219 is coupled between strap 204 and clamp 210. Similarly, second coupling clamp 212 is coupled about second circumferential strap 206 such that the first strap segment 218 is coupled between strap 206 and clamp 212. First strap segment 218 is then wound over the second clamp 212, across joint 112, and terminates proximate first clamp 210 such that the first strap segment 218 overlaps the second strap segment 219 between circumferential straps 204 and 206. Similarly, second strap segment 219 is wound over first clamp 210, across joint 112, and terminates proximate second clamp 212 such that the second strap segment 219 overlaps the first strap segment 218 between circumferential straps 204 and 206. In such a configuration, duct protection system 200 includes four layers of straps 208 between straps 204 and 206 for additional holding strength.

In another implementation, a first strap segment includes a corresponding hook material and is coupled to both circumferential straps 204 and 206 and extends away from joint 112 along first duct 108. A second strap segment includes a loop material and is coupled to the hook material of the first segment between circumferential straps 208 and 210, but extends away from joint 112 along second duct 110. The first and second segments are then folded over respective coupling clamps 210 and 212 and are each coupled to a third strap segment that includes partial hook material and partial loop material to couple with the corresponding the first and second segments. Alternatively, axial strap 208 may be formed from any number of segments and each segment may have any hook and loop configuration including, but not limited to, single sided hook material, single sided loop material, double sided hook material, double sided loop material, and double sided with one side hook material and the opposite side loop material. In such multiple segment configurations, strap 208 includes at least two layers fastening material, which provides for an increased tensile and shear strength.

In another configuration, axial strap 208 is a single strap segment 218 that includes a hook material on one side and a loop material on the opposite side. Strap 208 spans joint 112 and is coupled to circumferential straps 204 and 206. Ends 214 and 216 of strap 208 are folded over respective clamps 210 and 212 such that the hook and loop material on opposing sides of strap 208 at least partially overlap and facilitate coupling strap 208 around coupling clamps 210 and 212. In such single segment 218 configurations, the backing material of strap 208 may be different than in multiple segment configurations such that the backing provides an increased tensile and shear strength.

In the exemplary implementation, axial straps 208, comprising one or more strap segments 218, are looped tightly around coupling clamps 210 and 212 to substantially maintain enough compressive force on flanges 118 and 120 to maintain the integrity of joint 112. Joint 112 integrity is considered to be maintained when axial straps 208 prevent a sudden separation of ducts 108 and 110 that floods the area surrounding joint 112 with high temperature and/or high pressure fluids escaping from joint 112. For example, in one implementation, axial straps 208 apply a compressive force to flanges 118 and 120 to substantially prevent ducts 108 and 110 from rapidly separating in the event of a coupling separation such that no leakage occurs at joint 112. In another implementation, axial straps 208 apply a compressive force to flanges 118 and 120 to substantially prevent total separation of ducts 108 and 110 such that axial straps 208 apply a compressive force that allows for only a small leakage of the high temperature and high pressure fluid to occur at a more acceptable (slower) rate than if ducts 108 and 110 were allowed to rapidly separate. Generally, axial straps 208 each form a loop that spans joint 112 between flanges 118 and 120 and that encircles at least portion of both coupling clamps 210 and 212.

Figure 5:
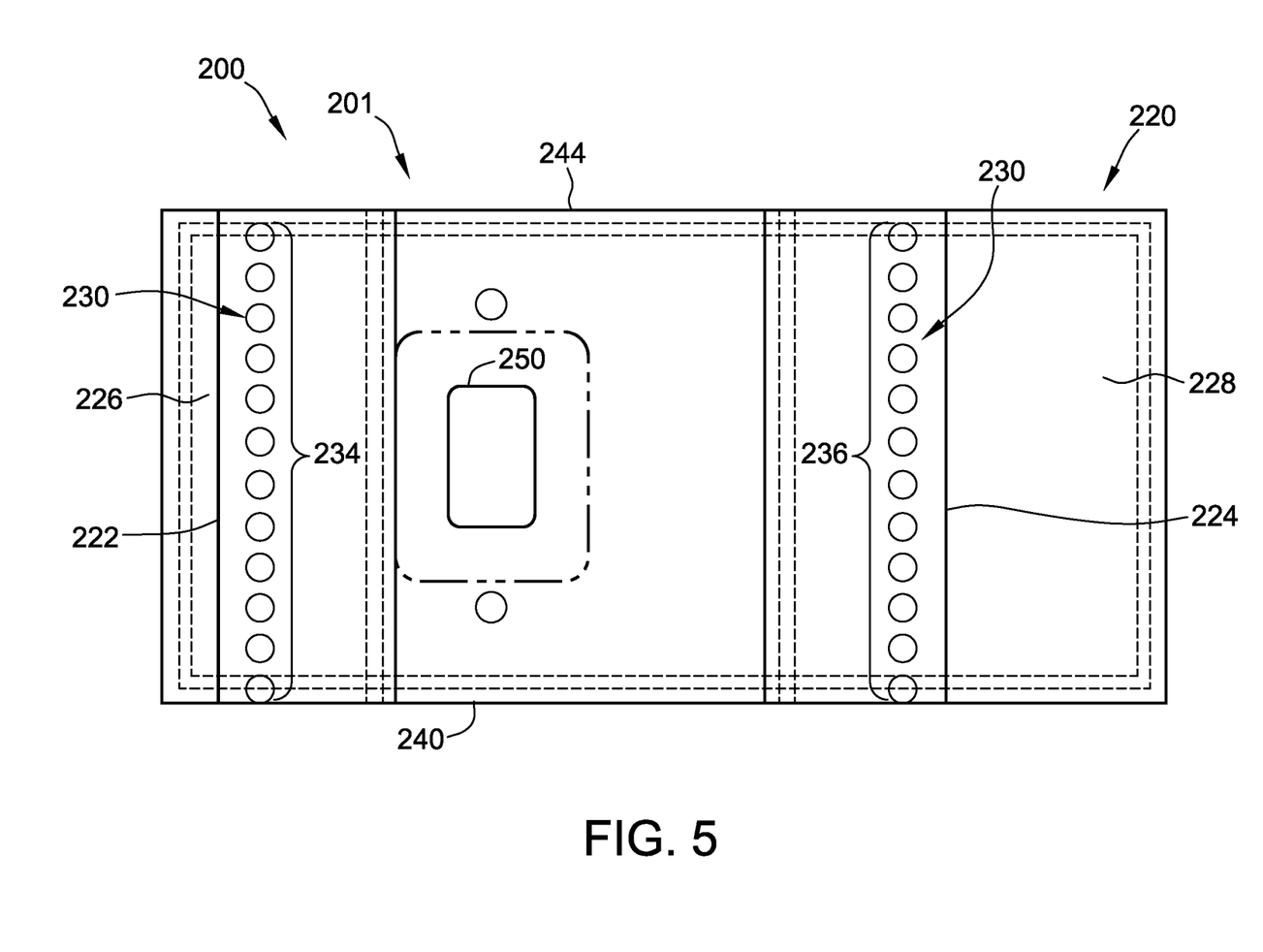
FIG. 5 is a top plan view of a joint protection sleeve.
Figure 6:
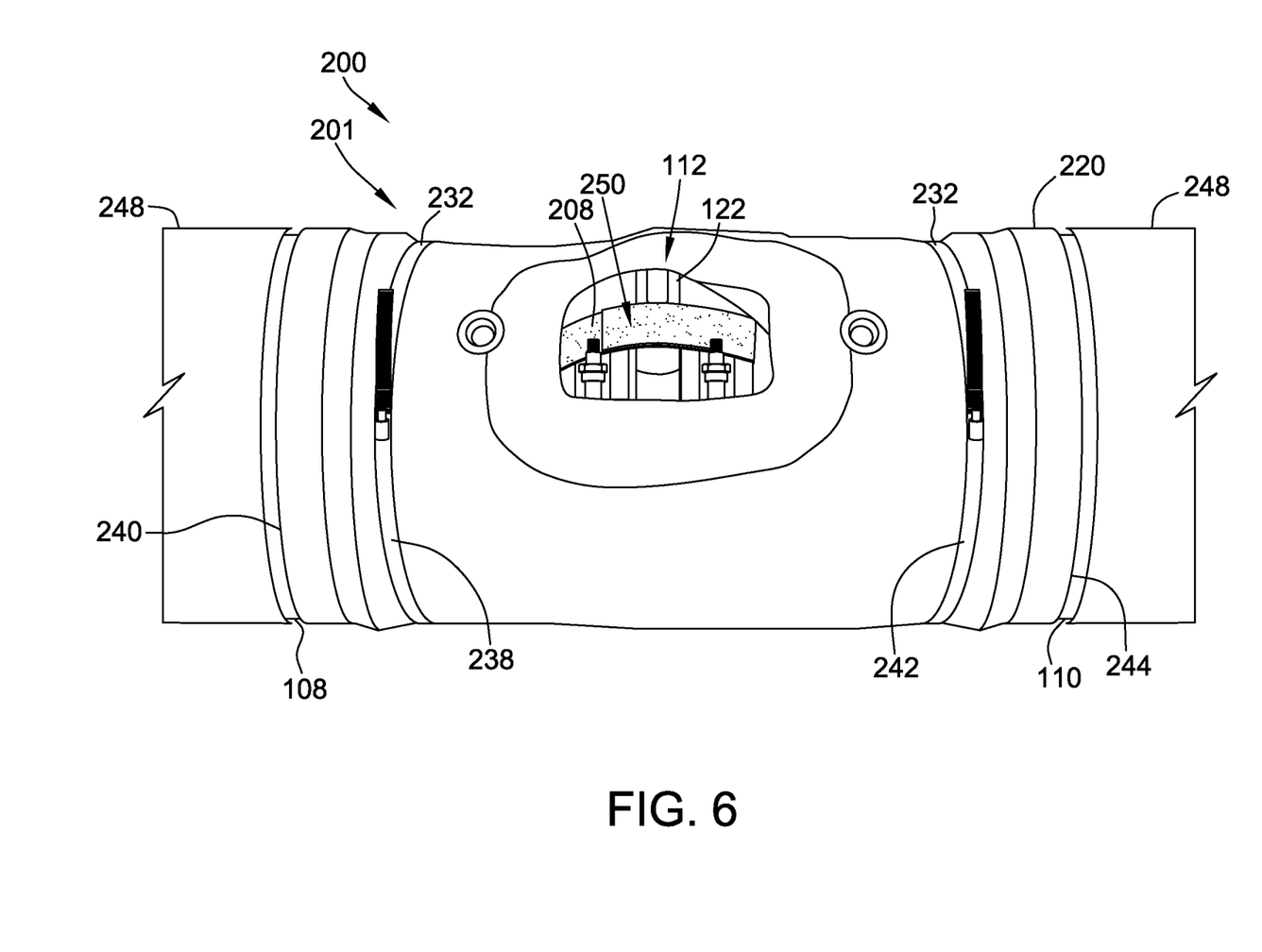
FIG. 6 is a side view of the fully assembled duct protection system.

FIG. 5 is a top plan view of a joint protection sleeve 220 of joint protection assembly 201. FIG. 6 is a side view of the fully assembled duct protection system 200. In the exemplary implementation, sleeve 220 is configured to circumscribe joint 112, including flanges 118 and 120, coupling clamps 210 and 212, coupling 122, and straps 202, to facilitate channeling a fluid within ducts 108 and 110 to protect surrounding structures in the event of a coupling separation. More specifically, sleeve 220 is oriented to channel the fluid discharged from joint 112 during a coupling separation event to an outside environment and/or in a preferentially directed way.

In the exemplary implementation, sleeve 220 includes a first circumferential end 222 spaced a distance from a second circumferential end 224. Sleeve 220 also includes a first flap 226 extending from first end 222 and a second flap 228 extending from second end 224. When sleeve 220 is wrapped around joint 112, flaps 226 and 228 at least partially overlap such that ends 222 and 224 are proximate each other to enable fastening of sleeve 220 to joint 112. In the exemplary implementation, sleeve 220 includes an axial fastener system 230 and a circumferential fastener system 232. As used herein, either fastener system 230 and/or 232 may be a self-supporting fastener. In the exemplary implementation, axial fastener system 230 includes a first axial fastener 234 proximate first end 222 and a second axial fastener 236 proximate second end 224. As sleeve 220 is positioned around joint 112, first and second flaps 226 and 228 at least partially overlap to enable first fastener 234 to mate with second fastener 236 such that sleeve 220 is secured about joint 112. In the exemplary implementation, fasteners 234 and 236 each include a plurality of grommets defined in sleeve 220 that are laced together using a tie. Alternatively, fasteners 234 and 236 may include a self-supporting fastener such as, but not limited to, a pressure zipper. Further, fasteners 234 and 236 may include hook and loop fasteners or any fastener that facilitates operation of sleeve 220 as described herein. Fasteners 234 and 236 and are releasably coupled to each other to enable sleeve 220 and/or any component of joint 112 to be inspected.

In the exemplary implementation, circumferential fastener system 232 includes a first circumferential fastener 238 positioned proximate a first axial end 240 of sleeve 220. Circumferential fastener system 232 also includes a second circumferential fastener 242 positioned proximate a second axial end 244 of sleeve 220. First and second circumferential fasteners 238 and 242 are configured to circumscribe sleeve 220 and prevent any air that is discharged from joint 112 from axially escaping sleeve 220 along ducts 108 and 110. In the exemplary implementation, fasteners 238 and 242 are independent steel band clamps that that coupled about sleeve 220 after sleeve 220 is positioned around joint 112. Alternatively, fasteners 238 and 242 are integrated with sleeve 220 and may formed from any material that enables sleeve 220 to operate as described herein.

In one implementation, joint protection sleeve 220 includes at least one air containment layer 246 that is formed from an a temperature resistant, impermeable material, such as, but not limited to, silicone rubber, such that air containment layer 246 facilitates shielding components surrounding joint 112 from exposure to the high temperature and high pressure fluid flow within ducts 108 and 110. More specifically, air containment layer 246 is formed from a lightweight, non-porous material capable of sealing and/or retaining air, gas, or liquids. In some examples, air containment layer 246 is formed from either a silicone coated glass cloth material and/or a substantially flexible polymer coated fabric, and is formed with a thickness in the range of ⅛ inch to ¹/₃₂ inch. Alternatively, air containment layer 246 is formed from any material having any thickness that facilitates substantially containing and/or sealing flow from ducts 108 and 110. Generally, air containment layer 246 is impermeable to a fluid flow such that the fluid is diverted circumferentially and/or axially within sleeve between an outer surface of a component of joint 112 (ducts 108 and 110, coupling 122, straps 202, coupling clamps 210 and 212) and air containment layer 246 until the fluid reaches at least one vent, as described in further detail below.

Additionally, joint protection sleeve 220 includes an insulation layer that thermally protects components surrounding joint 112 from heat exposure. The insulation layer may be positioned radially inward from or radially outward of air containment layer 246. Further, the insulation layer may be coupled between two separate air containment layers 246. Further, in another implementation, joint protection sleeve may include at least one ballistic containment layer that circumscribes joint 112 to facilitate preventing a fragment of ducts 108 and 110, coupling clamps 210 and 212, and/or coupling 122 from separating and impinging components surrounding joint 112. As such, because the ballistic containment layer intercepts the debris before it has a chance to be accelerated by the fluid flow in ducts 108 and 110, the ballistic containment layer facilitates "catching" the debris before it is accelerated to a velocity sufficient to penetrate the ballistic containment layer or any other portion of joint protection sleeve 220.

Furthermore, as shown in FIG. 6, duct protection system 200 also includes a plurality of duct protection sleeves 248 coupled to first and second ducts 108 and 110. Sleeves 248 are configured to contain the fluid discharged from ducts 108 and 110 in the event of a duct burst. Sleeves 248 include any combination of the layers and additional features, such as, but not limited to, vents, and fastening systems, described above with respect to sleeve 220.

In the exemplary implementation, joint protection sleeve 220 also includes a radially-oriented vent 250 formed in air containment layer 246 and any additional layers. Vent 250 is configured to direct fluid flow discharged from joint 112 to an outside environment or in a predetermined direction away from any sensitive equipment. Vent 250 is formed in sleeve 220 and at least through air containment layer 246 to cause the fluid flow (e.g., air, gas, or liquid) to be channeled through an entire thickness of sleeve 220. The fluid flow is discharged from vent 250 at a predetermined location that facilitates protecting structures from the high temperature and high pressure fluid exiting joint 112 in a duct separation event. In the exemplary example, vents 250 are fabricated from the same material as air containment layer 246. Alternatively, vents 214 may be fabricated from any material that is impermeable to the fluid flow. Although FIGS. 5 and 6 illustrate sleeve 220 including only a single vent 250, any number of vents 250 of any size can be used throughout sleeve 220.

Figure 7:
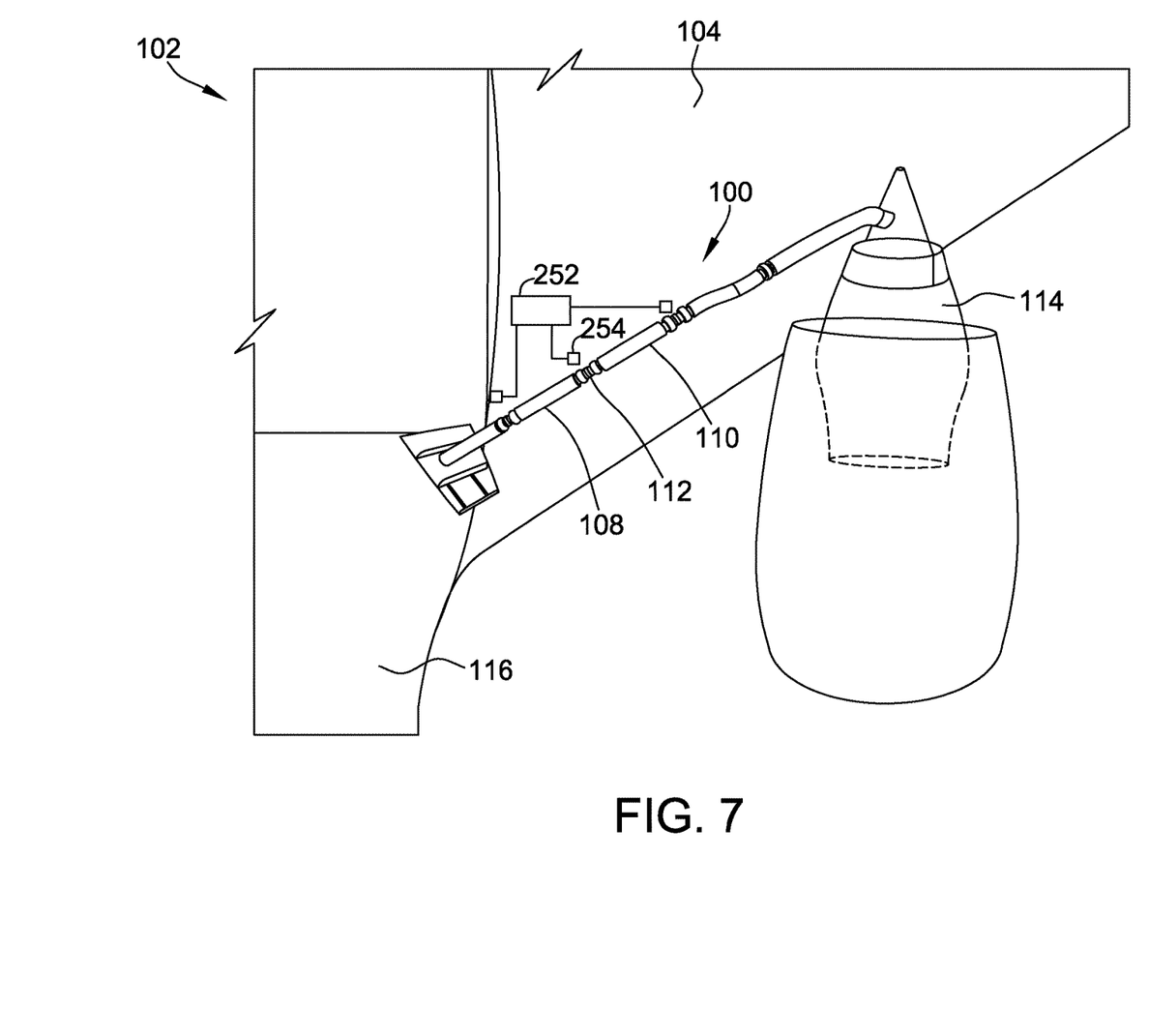
FIG. 7 is a top view of an exemplary duct system illustrating the duct protection system mounted within a vehicle.

FIG. 7 is a top view of duct system 100 mounted within a structure that channels a high pressure fluid from one location to another. In the exemplary example, duct system 100 is used within a vehicle, and specifically, an aircraft 102. Aircraft 102 may include, but is not limited to only including, airplanes, unmanned aerial vehicles (UAVs), gliders, helicopters, and/or any other vehicle that travels through airspace. However, it is contemplated that duct system 100 may be used in any structure that channels a high pressure fluid and is not limited for use only within vehicles or aircraft.

In the exemplary example, duct system 100 is located within a wing 104 of aircraft 102 and facilitates channeling bleed air from an engine 114 coupled to wing 104 to an aircraft fuselage 116 for use in other aircraft 102 systems. Alternatively, duct system 100 may be any duct system capable of channeling air, gas, and/or liquid through a structure. Duct system 100 may be any size, and may be formed from any material (e.g., titanium, stainless steel, or nickel alloy) that is capable of channeling air, gas, and/or liquid through a vehicle. In some examples, duct system 100 channels at least one of a high pressure flow, a low pressure flow, a high temperature flow, and a low temperature flow therethrough.

As shown in FIG. 7, joint protection system 201 also includes a duct leakage overheat detection system (DLODS) 252 that is configured to detect a leakage from joint 112 and to terminate the fluid flow within ducts 108 and 110. DLODS 252 includes at least one sensor 254 positioned adjacent to joint 112. More specifically, in the exemplary implementation, sensor 254 is positioned a distance from joint 112 and aligned with vent 250 such that, in the event of a leakage event, sensor 254 detects the flow being discharged from vent 250 in sleeve 220. Alternatively, or in combination therewith, DLODS 252 includes a sensor 254 coupled to sleeve 220. More specifically, sensor 254 is coupled to air containment layer 246 or between various layers of sleeve 220. In the exemplary example, sensor 254 is a thermal sensor. Alternatively, sensor 254 can be any sensor used to detect flow or heat characteristics such as, but not limited to, a chemical sensor, a flow sensor, and/or strain gauge. In some examples, sensor 254 is coupled to a display unit (not shown) to enable data collected by sensor 254 to be quickly viewed. Alternatively, sensor 254 is coupled to a remote computing device (not shown) that stores, analyzes, presents, and/or transmits data collected by sensor 254. It should be noted that sensor 254 can be coupled to a display unit and/or a remote computing device via a wired or wireless signal. In the exemplary example, sleeve 220 directs a fluid flow discharged from joint 112 towards sensor 254 such that flow characteristics of the fluid flow may be presented to a user.

The examples described herein for a system or device that is able to maintain a compressive force between adjacent duct sections in the event of a coupling separation to prevent rapid duct separation, to extend the time of decompression, and to protect any sensitive structures surrounding the duct. The examples described herein include axial straps that are looped tightly around a pair of coupling clamps to substantially maintain enough compressive force on flanges of adjacent duct sections to maintain the integrity of the joint between the duct sections. Joint integrity is considered to be maintained when the axial straps prevent a sudden separation of the duct sections that would flood the area surrounding the joint with high temperature and/or high pressure fluids. In one implementation, the axial straps apply a compressive force to substantially prevent the duct sections from rapidly separating during a coupling separation event such that no leakage occurs at the joint. In another implementation, the axial straps apply a compressive force to substantially prevent total separation of the duct sections such that only a small leakage of the high temperature and/or high pressure fluid occurs at a more acceptable (slower) rate than if the duct sections were allowed to rapidly separate. Although the examples described above are described in relation to a vehicle, the examples may be implemented in stationary applications such as buildings having duct systems.

Although specific features of various examples of the invention may be shown in some drawings and not in others, this is for convenience only. In accordance with the principles of the invention, any feature of a drawing may be referenced and/or claimed in combination with any feature of any other drawing.

This written description uses examples to disclose various examples, which include the best mode, to enable any person skilled in the art to practice those examples, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An assembly for protecting a joint formed between a first duct and an adjacent second duct, said assembly comprising:
   a first coupling element coupled about the first duct;
   a second coupling element coupled about the second duct;
   a plurality of axial straps coupled between said first coupling element and said second coupling element such that at least one axial strap of said plurality of straps forms a loop that encircles a portion of said first coupling element and said second coupling element; and
   a sleeve circumscribing the joint, wherein said sleeve comprises a vent defined therethrough, wherein said vent is positioned over the joint such that any fluid escaping the joint is channeled through said vent.

2. The assembly according to claim 1, wherein said plurality of axial straps apply a compressive force to the first and second ducts at the joint to maintain integrity of the joint.

3. The assembly according to claim 1, wherein said plurality of axial straps are oriented substantially parallel to the first and second ducts.

4. The assembly according to claim 1, wherein at least one axial strap of said plurality of axial straps comprises a plurality of strap segments.

5. The assembly according to claim 1, wherein said plurality of axial straps are formed from a metallic material.

6. The assembly according to claim 1, wherein said plurality of axial straps includes at least one of a hook and loop fastener material.

7. The assembly according to claim 1 further comprising a first circumferential strap coupled about the first duct and a second circumferential strap coupled about the second duct, wherein at least one axial strap of said plurality of axial straps is coupled to said first circumferential strap and to said second circumferential strap.

8. A method of maintaining integrity of a duct joint, said method comprising:
   coupling a first coupling element about the first duct, wherein the first duct is positioned proximate a second duct to form a joint therebetween;
   coupling a second element about the second duct;
   coupling a plurality of axial straps between the first and second coupling elements such that at least one axial strap of the plurality of straps forms a loop that encircles a portion of each of the first and second coupling elements;
   applying a compressive force to the first and second ducts to maintain integrity of the joint; and
   coupling a sleeve about the joint such that the sleeve covers the first coupling element, the second coupling element, and the plurality of axial straps, and such that a vent defined in the sleeve is positioned over the joint, wherein the vent is configured to channel any fluid escaping the joint in a predetermined direction.

9. The method of claim 8 further comprising maintaining the compressive force at the joint to maintain joint integrity when the first and second ducts at least partially separate.

10. The method of claim 8 further comprising:
    coupling a first circumferential strap about the first duct; and
    coupling a second circumferential strap about the second duct, wherein at least one axial strap of the plurality of axial straps is coupled to the first circumferential strap and to the second circumferential strap.

11. The method of claim 10, wherein coupling a first coupling element about the first duct comprises coupling the first coupling element such that the first coupling element at least partially overlaps said first circumferential strap, and wherein coupling a second coupling element about the second duct comprises coupling the second coupling element such that the second coupling element at least partially overlaps said second circumferential strap.

12. The method of claim 8 further comprising positioning a sensor proximate the sleeve, wherein the sensor is configured to detect a fluid being channeled through the vent.

13. The method of claim 8, wherein coupling a plurality of axial straps between the first and second coupling elements comprises coupling at least one axial strap that includes a plurality of strap segments.

14. An aircraft comprising:
    a first duct;
    a second duct coupled to said first duct to form a joint therebetween; and
    a joint protection assembly comprising:
      a first circumferential strap coupled about the first duct;
      a first coupling element coupled about said first duct such that said first coupling element at least partially overlaps said first circumferential strap;
      a second circumferential strap coupled about the second duct;
      a second coupling element coupled about said second duct such that said second coupling element at least partially overlaps said second circumferential strap; and
      a plurality of axial straps coupled between said first coupling element and said second coupling element such that at least one axial strap of said plurality of straps forms a loop that encircles a portion of each of said first coupling element and said second coupling element, wherein at least one axial strap of said plurality of axial straps is coupled to said first circumferential strap and to said second circumferential strap, and wherein said plurality of axial straps apply a compressive force to the first and second ducts at said joint to maintain integrity of the joint.

15. The aircraft according to claim 14 further comprising a first circumferential strap coupled about the first duct and a second circumferential strap coupled about the second duct, wherein at least one axial strap of said plurality of axial straps is coupled to said first circumferential strap and to said second circumferential strap.

16. The aircraft according to claim 14 further comprising a sleeve circumscribing said joint, wherein said sleeve comprises a vent defined therethrough, wherein said vent is positioned over the joint such that any fluid escaping the joint is channeled through said vent.

17. The aircraft according to claim 16 further comprising a leak detection system comprising a sensor configured to detect a fluid being channeled through said vent.

18. The aircraft according to claim 14, wherein at least one axial strap of said plurality of axial straps comprises a plurality of strap segments.

\* \* \* \* \*